US011529703B2

(12) United States Patent
Shu et al.

(10) Patent No.: US 11,529,703 B2
(45) Date of Patent: Dec. 20, 2022

(54) MOVEMENT SUPPORT

(71) Applicant: SHANGHAI HUGONG ELECTRIC (GROUP) CO., LTD., Shanghai (CN)

(72) Inventors: Zhenyu Shu, Shanghai (CN); Hongtao Zhao, Shanghai (CN)

(73) Assignee: SHANGHAI HUGONG ELECTRIC (GROUP) CO., LTD., Shanghai (CN)

(*) Notice: Subject to any disclaimer, the term of this patent is extended or adjusted under 35 U.S.C. 154(b) by 547 days.

(21) Appl. No.: 16/660,814

(22) Filed: Oct. 23, 2019

(65) Prior Publication Data

US 2020/0338673 A1 Oct. 29, 2020

(30) Foreign Application Priority Data

Apr. 29, 2019 (CN) ........................ 201910356800.X

(51) Int. Cl.
*B23K 37/00* (2006.01)
*B23K 37/02* (2006.01)

(52) U.S. Cl.
CPC ........ *B23K 37/003* (2013.01); *B23K 37/0282* (2013.01)

(58) Field of Classification Search
CPC ...... B23K 9/1006; B23K 9/32; B23K 9/1043; B23K 37/003; B23K 10/006; B23K 37/00; B23K 9/095; H01L 23/40; H01L 2924/3011; H01L 2023/4037; H01L 2023/4043; H01L 2023/405; G06F 1/181; G06F 1/20; G06F 1/18; G06F 1/182; G06F 1/189; G06F 1/26; H05K 7/20918; H05K 7/20909; H05K 7/20163; H05K 1/0203
See application file for complete search history.

(56) References Cited

U.S. PATENT DOCUMENTS 2,882,478 A * 4/1959 Blankenbuehler ... B23K 9/1006 165/47
3,253,646 A * 5/1966 Koltuniak .......... H05K 7/20909 165/104.34
5,642,260 A 6/1997 Sigl
6,489,591 B1 * 12/2002 Achtner ................... B23K 9/32 219/130.1
6,693,371 B2 * 2/2004 Ziegler ................... H02J 9/062 307/64
6,814,659 B2 * 11/2004 Cigelske, Jr. ...... H05K 7/20181 454/277

(Continued)

FOREIGN PATENT DOCUMENTS

CN 1825201 8/2006
CN 102073357 5/2011

(Continued)

*Primary Examiner* — Erin B Saad
(74) *Attorney, Agent, or Firm* — Cooper Legal Group, LLC

(57) ABSTRACT

A movement support includes a base. An air inlet is formed in the base. A drainage plate is installed on the base. A first heat dissipating flow channel communicated with the air inlet is formed in the base on one side of the drainage plate. A second heat dissipating flow channel communicated with the air inlet is formed in the base on the other side of the drainage plate. The first heat dissipating flow channel and the second heat dissipating flow channel between the drainage plate and the air inlet are communicated with each other.

9 Claims, 3 Drawing Sheets

14 15 5 2 3 7 11 13 12 10 9 6 17 1

(56) References Cited

U.S. PATENT DOCUMENTS

| | | | | |
|---|---|---|---|---|
| 6,888,099 | B1 * | 5/2005 | Schneider | H05K 7/20918 219/136 |
| 7,005,608 | B2 * | 2/2006 | Spear | B23K 9/10 219/130.1 |
| 10,150,173 | B2 * | 12/2018 | Altekruse | B23K 9/325 |
| 10,183,355 | B2 * | 1/2019 | Peterson | B23K 37/02 |
| 10,238,004 | B2 * | 3/2019 | Baran | F04D 27/008 |
| 10,456,851 | B2 * | 10/2019 | Borneman | B23K 9/16 |
| 10,875,118 | B2 * | 12/2020 | Sigl | B23K 9/1006 |
| D907,080 | S * | 1/2021 | Shu | D15/144 |
| 10,925,194 | B2 * | 2/2021 | Dessart | B23K 37/003 |
| 11,076,504 | B2 * | 7/2021 | Patil | H05K 7/2049 |

FOREIGN PATENT DOCUMENTS

| | | |
|---|---|---|
| CN | 203673829 | 6/2014 |
| CN | 203675519 | 6/2014 |
| CN | 203679492 | 7/2014 |
| CN | 205271121 | 6/2016 |
| CN | 206212541 | 5/2017 |
| CN | 206775899 | 12/2017 |
| CN | 107738027 | 2/2018 |
| CN | 208162829 | 11/2018 |
| CN | 208796190 | 4/2019 |
| DE | 4032095 | 7/1991 |
| JP | H09113180 | 5/1997 |

* cited by examiner

MOVEMENT SUPPORT

CROSS-REFERENCE TO RELATED APPLICATION

This application claims the priority benefit of China application serial no. 201910356800.X, filed on Apr. 29, 2019. The entirety of the above-mentioned patent application is hereby incorporated by reference herein and made a part of this specification.

BACKGROUND

Technical Field

The invention relates to the technical field of supports, in particular to a movement support.

Description of Related Art

The inverter welding machine is characterized in that three-phase or single-phase 50 Hz power frequency alternating current is rectified and filtered to result smooth direct current. An inverter circuit composed of IGBTs or field effect tubes converts the direct current into 15-100 kHz alternating current; and after the intermediate frequency main transformer is depressurized, rectifying and filtering are conducted again to result smooth direct current output welding current (or the alternating current with the required frequency is reversely output again). The control circuit of the inverter welding and cutting device is composed of a given circuit, a driving circuit and the like. The whole machine cycle control is realized by processing the feedback of voltage and current signals. The control technology taking Pulse Width Modulation (PWM) as the core is adopted so that the constant current characteristic of fast Pulse Width Modulation and excellent welding and cutting process effect are obtained.

A movement support is mounted in a housing of an existing inverter welding machine. An inverter circuit board or electronic parts and components such as an inductor are mounted on the movement support; and a fan is mounted on the movement support and the inverter circuit board or the electronic parts and components mounted on the movement support are cooled by the fan. The heat dissipated by circuit boards with different power or different density degrees is different, while the air volume blown by the fan uniformly dissipates heat for the inverter circuit board or the electronic parts and components, such that the heat in some sections is too much to be effectively dissipated. Therefore, the service life of the inverter circuit board or the electronic parts and components is affected, and the normal use of the inverter welding machine is also affected.

The invention “Vehicle Machine Equipment and Machine Core Rack With Heat Insulation Diversion Function” with the publication patent number of CN203673829U discloses a front wall, a bottom wall and a rear wall integrally connected and formed. The front wall is provided with an air inlet, and the rear wall is provided with an air outlet, and the bottom wall is spaced from the bottom surface of the machine core during installation to form a first wind channel and a second wind channel in the inner space of a case. The first wind channel is positioned between the bottom wall and the machine core and communicated with the air inlet and the air outlet; and the second wind channel is positioned between an outer side of the bottom wall and the bottom of the case.

According to the above-mentioned patent, the fan is not mounted on the machine core rack, but on the case; and the first wind channel is communicated with a heat dissipation channel formed by the fan through the air inlet arranged on the machine core rack, and the air volume in the first wind channel is directly influenced by the limitation of the air inlet so as to influence the heat dissipating effect of the machine core. If the heat dissipation object of the first wind channel dissipates more heat than the machine core does, the heat dissipated from the first wind channel is far from achieving heat dissipating effect.

SUMMARY

The invention aims to provide a movement support. A first heat dissipating flow channel and a second heat dissipating flow channel of the movement support are directly communicated with an air inlet. A drainage plate only conducts drainage on the intake air volume from the air inlet. The heat dissipating effect in some sections being not ideal is mitigated, and the intake air volume from the air inlet can be ensured to fully dissipate heat.

The technical purpose of the invention is achieved through the following technical scheme. A movement support includes a base. An air inlet is formed in the base. A drainage plate is installed on the base on one side of the air inlet. A first heat dissipating flow channel communicated with the air inlet is formed on the base on one side of the drainage plate. A second heat dissipating flow channel communicated with the air inlet is formed on the base on the other side of the drainage plate. The first heat dissipating flow channel and the second heat dissipating flow channel between the drainage plate and the air inlet are communicated with each other.

By adopting the technical scheme, the air volume entering the inverter welding machine housing from the air inlet is guided to the first heat dissipating flow channel or the second heat dissipating flow channel by the drainage plate. Because the first heat dissipating flow channel or the second heat dissipating flow channel are installed to be directly communicated with the air inlet, the air volume entering the inverter welding machine housing from the air inlet is not shielded by an obstruction so as to avoid influencing the effective heat dissipating air volume.

The present invention is further configured as follows. A cross-sectional area of the first heat dissipating flow channel is smaller than that of the second heat dissipating flow channel.

By adopting the technical scheme, when the heat dissipated by an inverter circuit board or electronic parts and components arranged on the base on one side of the second heat dissipating flow channel is larger than the heat dissipated by the inverter circuit board or the electronic parts and components arranged on the base on one side of the first heat dissipating flow channel, the cross-sectional area of the first heat dissipating flow channel is smaller than the cross-sectional area of the second heat dissipating flow channel. The cross-sectional area of the heat dissipating flow channel is directly proportional to the heat dissipated by the inverter circuit board or the electronic parts and components arranged on the same side, so that sufficient air volume can be ensured to effectively dissipate heat where the heat is excessive.

The invention is further configured as follows. More than two first flow guiding bumps are installed on the drainage plate in the first heat dissipating flow channel, and a distance between two adjacent first flow guiding bumps close to one end of the air inlet is larger than a distance between two adjacent first flow guiding bumps remote from one end of the air inlet.

By adopting the technical scheme, the air volume passing through the first heat dissipating flow channel can be guided by the arrangement of the first flow guiding bump. Due to the fact that the distance between two adjacent first flow guiding bumps close to one end of the air inlet is larger than the distance between two adjacent first flow guiding bumps remote from one end of the air inlet, when the intake air volume is constant, the air volume flow channel is narrowed and the squeezing force thereof is increased so that the air speed is accelerated and the heat dissipating effect is improved accordingly.

The present invention is further configured as follows. More than one second flow guiding bump is installed on the drainage plate in the second heat dissipating flow channel, and the second flow guiding bump and the first flow guiding bump are installed in a staggered mode.

By adopting the technical scheme, the air volume passing through the second heat dissipating flow channel can be guided by the arrangement of the second flow guiding bump. Due to the fact that the second flow guiding bump and the first flow guiding bump are installed in a staggered mode, the possibility that the air volume on two sides of the drainage plate will squeeze the drainage plate at the same time can be reduced, and the structural firmness of the drainage plate is reduced.

The present invention is further configured as follows. The base is provided with a first mounting plate. The first mounting plate is connected to the first supporting plate. A first inner cavity is formed among the first mounting plate, the first supporting plate and the base. The first supporting plate is provided with a drainage plate. A fifth through-hole communicated with the first inner cavity is formed in the base.

By adopting the technical scheme, electronic parts and components can be stored in the first inner cavity. Due to the fact that the base is provided with the fifth through-hole communicated with the first inner cavity, the first inner cavity is communicated with an outer side of the base through the fifth through-hole, such that the heat of electronic parts and components mounted in the first inner cavity can be dissipated or the heat of an inverter circuit board arranged on the outer side of the inner cavity can be directly dissipated.

The present invention is further configured as follows. The base below the air inlet is provided with a first through-hole and/or the first mounting plate is provided with a second through-hole.

By adopting the technical scheme, the first inner cavity forms convection with the outer side of the base through the first through-hole and the fifth through-hole. As the first through-hole is arranged below the air inlet, when the air inlet is provided with a fan to ventilate to and dissipate heat for the first heat dissipating flow channel and the second heat dissipating flow channel, the fan reverses to form negative pressure, so that the heat dissipation wind speed of the outer side of the base passing through the first through-hole and the first inner cavity is accelerated.

The second through-hole is communicated with two sides of the first mounting plate, wherein one side the first mounting plate is communicated is positioned below the first heat dissipating flow channel, and the other side the first mounting plate is communicated is positioned below the second heat dissipating flow channel, so that the two sides of the first mounting plate are communicated to avoid excessive heat in some sections. Meanwhile, excessive heat in the first inner cavity is prevented, so is the resulting difficulty of dissipating.

The present invention is further configured as follows. A flow guiding plate is mounted on the first supporting plate on one side, remote from the drainage plate, of the first heat dissipating flow channel, and a flow guiding groove is formed in a side wall of the flow guiding plate on one side close to the first heat dissipating flow channel. A groove curve of the flow guiding groove at one end connected to the base is on a same surface as an inner wall of the air inlet, and a width of the groove of the flow guiding groove is sequentially reduced from an end close to the air inlet and towards the other end remote from the air inlet.

By adopting the technical scheme, the air volume in the first heat dissipating flow channel can be guided by arranging the flow guiding groove. Due to the fact that the groove curve of the flow guiding groove at one end connected to the base is on the same surface as the inner wall of the air inlet, the air volume entering the inverter welding machine housing from the air inlet is not shielded by the flow guiding plate so as to avoid influencing the effective heat dissipating air volume.

Meanwhile, due to the fact that the width of the groove of the flow guiding groove close to one end of the air inlet towards remote from one end of the air inlet is sequentially reduced, when the intake air volume is constant, the air volume flow channel is narrowed, and the squeezing force thereof is increased so that the air speed is accelerated and the heat dissipating effect is improved accordingly.

The present invention is further configured as follows: a second mounting plate is mounted on the base on one side, remote from the air inlet, of the first mounting plate. The second mounting plate is connected to a second supporting plate, and a second inner cavity is formed among the second mounting plate, the second supporting plate and the base. The second supporting plate is provided with a third through-hole.

By adopting the technical scheme, the second inner cavity can store electronic parts and components. And the second inner cavity is communicated with the outer side of the second supporting plate through the third through-hole, so that excessive heat in the second inner cavity is prevented, and so is the resulting difficulty of dissipating.

The present invention is further configured as follows: the second mounting plate is provided with a fourth through-hole communicated with the third through-hole.

By adopting the technical scheme, the second inner cavity is communicated with the outer side of the second mounting plate through the fourth through-hole, so that excessive heat in the second inner cavity is prevented, and so is the resulting difficulty of dissipating.

Meanwhile, the third through-hole is communicated with the fourth through-hole so that the circulation area is effectively enlarged and the heat dissipating effect is improved.

The present invention is further configured as follows: the base is provided with a mounting frame extending towards one end remote from the drainage plate, and a sixth through-hole is formed in the base and/or the mounting frame.

By adopting the technical scheme, the arrangement of the mounting frame is convenient for mounting the base and the inverter welding machine housing. The arrangement of the sixth through-hole is communicated with a cavity formed among the outer side of the base, the base and the inverter welding machine housing. At the same time the sixth through-hole and the fifth through-hole are used cooperatively, so that the cavity in the form between the base and the inverter welding machine housing forms a heat dissipating flow channel.

In summary, the invention has the beneficial technical effects as follows.

(1) The first heat dissipating flow channel or the second heat dissipating flow channel are installed to be directly communicated with the air inlet, and the air volume entering the inverter welding machine housing from the air inlet is not shielded by an obstruction so as to avoid influencing the effective heat dissipating air volume.

(2) Due to the fact that the distance between two adjacent first flow guiding bumps close to one end of the air inlet is larger than the distance between two adjacent first flow guiding bumps remote from one end of the air inlet, when the intake air volume is constant, the air volume flow channel is narrowed and the squeezing force thereof is increased so that the air speed is accelerated and the heat dissipating effect is improved accordingly.

(3) When the air inlet is provided with a fan to ventilate to and dissipate heat for the first heat dissipating flow channel and the second heat dissipating flow channel, the fan reverses to form negative pressure, so that the heat dissipation wind speed of the outer side of the base passing through the first through-hole and the first inner cavity is accelerated.

(4) Due to the fact that the groove curve of the flow guiding groove at one end connected to the base is on the same surface as the inner wall of the air inlet, the air volume entering the inverter welding machine housing from the air inlet is not shielded by the flow guiding plate so as to avoid influencing the effective heat dissipating air volume; and meanwhile, because the width of the groove of the flow guiding groove close to one end of the air inlet towards remote from one end of the air inlet is sequentially reduced, when the intake air volume is constant, the air volume flow channel is narrowed, and the squeezing force thereof is increased so that the air speed is accelerated and the heat dissipating effect is improved accordingly.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The present invention will now be described in further detail below with reference to the accompanying drawings.

Figure 1:
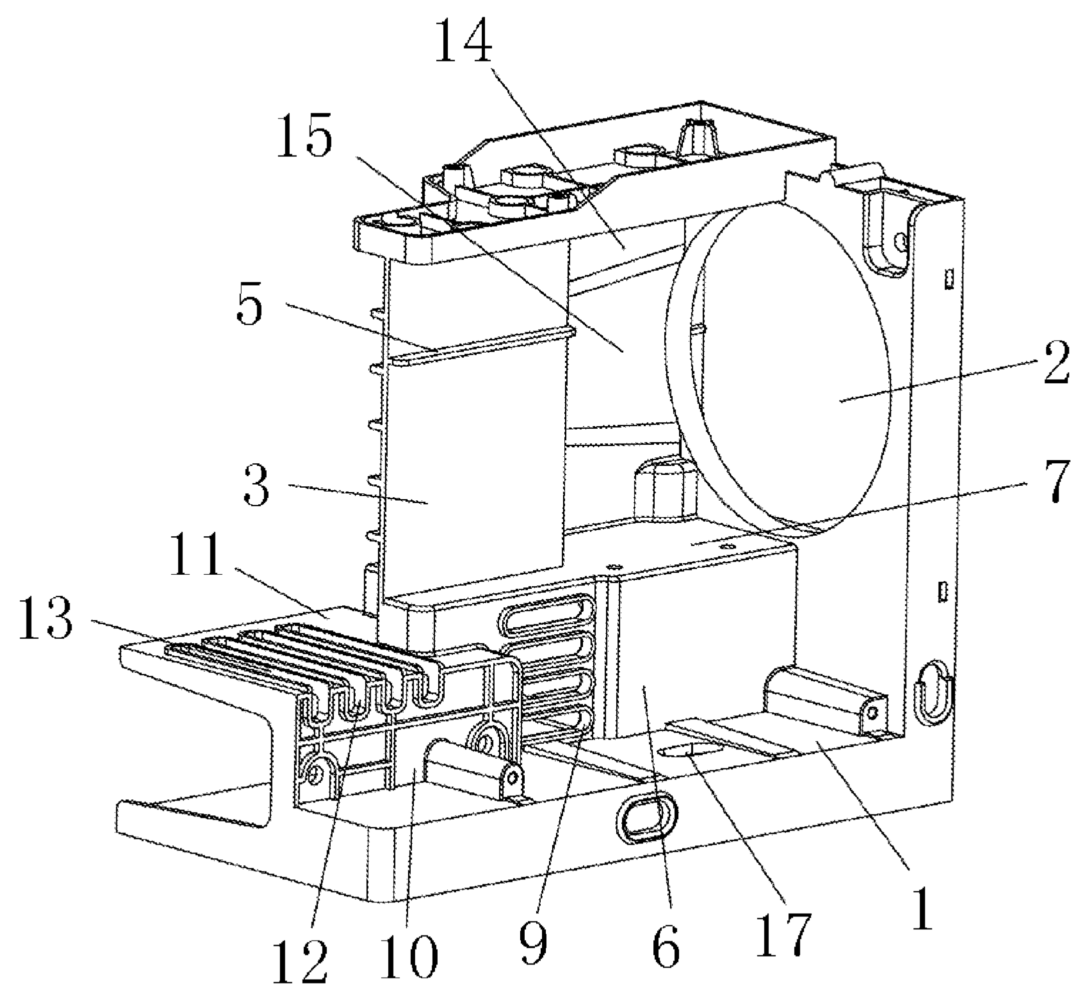
FIG. 1 is a schematic view showing a first structure of a movement support according to the present invention.

FIG. 1 is a movement support according to the present invention, the movement support comprises an L-shaped base 1 and a circular air inlet 2 arranged on a vertical plate of the L-shaped base 1. A fan is arranged on the air inlet 2 in the embodiment. A first mounting plate 6 is vertically mounted on a horizontal plate of the L-shaped base 1 below the air inlet 2, and one end of the first mounting plate 6 is vertically connected to the vertical plate of the L-shaped base 1. A first mounting plate 6 remote from one end connected to the horizontal plate of the L-shaped base 1 is vertically connected to one end of a first supporting plate 7, wherein the first supporting plate 7 is arranged in parallel with the horizontal plate of the L-shaped base 1.

Figure 2:
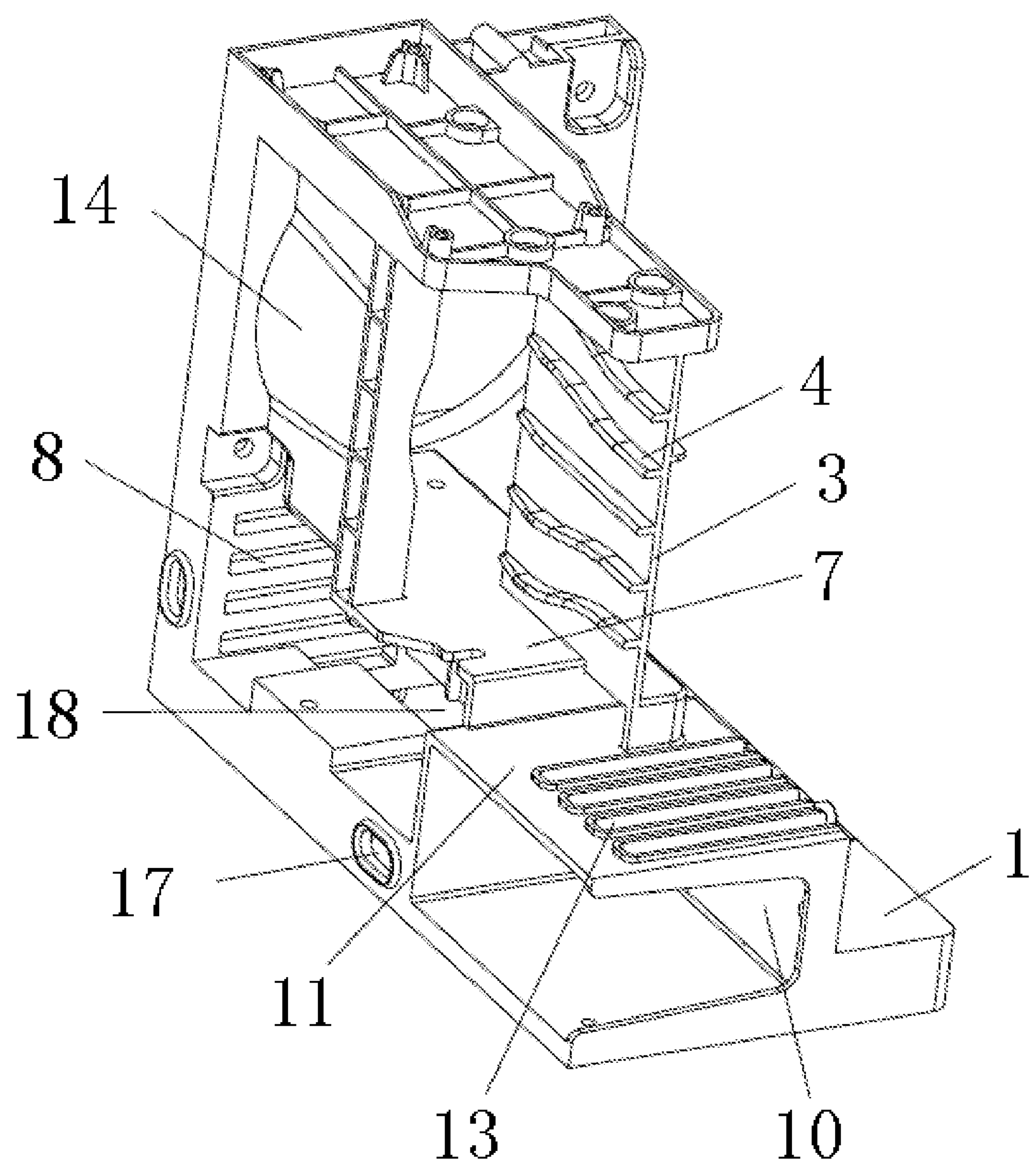
FIG. 2 is a schematic view showing a second structure of a movement support according to the present invention to show the structures of a first inner cavity and a second inner cavity.

Referring to FIG. 2, a first inner cavity is formed among the base 1, the first mounting plate 6 and the first supporting plate 7. The horizontal plate of the L-shaped base 1 in the first inner cavity is provided with a fifth through-hole 18.

The vertical plate of the L-shaped base 1 in the first inner cavity is provided with a first through-hole 8.

Referring to FIG. 1, the first mounting plate 6 is provided with a second through-hole 9.

According to actual heat dissipation requirement, the vertical plate of the L-shaped base 1 in the first inner cavity is provided with a first through-hole 8, and the first mounting plate 6 is not provided with a second through-hole 9. The first mounting plate 6 is provided with a second through-hole 9, and the vertical plate of the L-shaped base 1 in the first inner cavity is not provided with a first through-hole 8. The vertical plate of the L-shaped base 1 in the first inner cavity can also be provided with a first through-hole 8, and the first mounting plate 6 is provided with a second through-hole 9.

The second through-hole 9 or the first through-hole 8 and the fifth through-hole 18 communicate the inner side and the outer side of the first inner cavity to form convection, so that the electronic parts and components mounted in the first inner cavity can directly dissipate heat for the inverter circuit board on the outer side of the first inner cavity.

The first supporting plate 7 is vertically provided with a drainage plate 3, which is vertical to the vertical plate of the L-shaped base 1 and isolates and drains an air inlet 2 into two dissipating flow channels. A first heat dissipating flow channel communicated with the air inlet 2 is formed on the base 1 on one side of the drainage plate 3, and a second heat dissipating flow channel communicated with the air inlet 2 is formed on the base 1 on the other side of the drainage plate 3, and the first heat dissipating flow channel between the drainage plate 3 and the air inlet 2 is communicated with the second heat dissipating flow channel.

In the embodiment, since the number of the inverter circuit boards arranged on the base 1 on one side of the second heat dissipating flow channel is larger than the number of the inverter circuit boards arranged on the base 1 on one side of the first heat dissipating flow channel, the heat dissipated by the inverter circuit board is also larger. A cross-sectional area of the first heat dissipating flow channel is thus smaller than that of the second heat dissipating flow channel. Therefore, most of the air volume entering from the air inlet 2 can effectively dissipate heat for the inverter circuit board arranged on the base 1 on one side of the second heat dissipating flow channel.

Referring to FIG. 2, five first flow guiding bumps 4 are installed on the drainage plate 3 in the first heat dissipating flow channel, and a distance between two adjacent first flow guiding bumps 4 close to one end of the air inlet 2 is larger than a distance between two adjacent first flow guiding bumps 4 remote from one end of the air inlet 2.

Referring to FIG. 1, the drainage plate 3 in the second heat dissipating flow channel is provided with one second flow guiding bump 5, and the second flow guiding bump 5 and the first flow guiding bump 4 are installed in a staggered mode.

The drainage plate 3 remote from one end connected to the first supporting plate 7 is vertically connected to a circuit board mounting plate 19, and the circuit board mounting plate 19 remote from one end connected to the drainage plate 3 is connected to the vertical plate of the base 1 above the air inlet 2, and the circuit board mounting plate 19 and the first supporting plate 7 are arranged in parallel.

A flow guiding plate 14 is mounted on the first supporting plate 7 on one side of the first heat dissipating flow channel remote from the drainage plate 3, and the flow guiding plate 14 remote from one end connected to the first supporting plate 7 is vertically connected to the circuit board mounting plate 19. A flow guiding groove 15 is formed in a side wall of the flow guiding plate 14 close to one side of the first heat dissipating flow channel, and a groove curve of the flow guiding groove 15 at one end connected to the vertical plate of the L-shaped base 1 and the inner wall of the air inlet 2 are on the same surface, and a groove width of the flow guiding groove 15 is sequentially reduced from an end thereof close to the air inlet 2 towards the other end thereof remote from the air inlet 2.

A second mounting plate 10 is vertically mounted on the horizontal plate of the L-shaped base 1 on the side, remote from the air inlet 2, of the first mounting plate 6, and the second mounting plate 10 is arranged in parallel with the first mounting plate 6. A second mounting plate 10 remote from the end connected to the horizontal plate of the L-shaped base 1 is vertically connected to one end of a second supporting plate 11, which is connected to the first mounting plate 6 and installed on the same side as that of the first supporting plate 7.

A second inner cavity is formed among the second mounting plate 10, the second supporting plate 11 and the base 1. A third through-hole 12 is formed in the second supporting plate 11. A fourth through-hole 13 communicated with the third through-hole 12 is formed in the second mounting plate 10.

Figure 3:
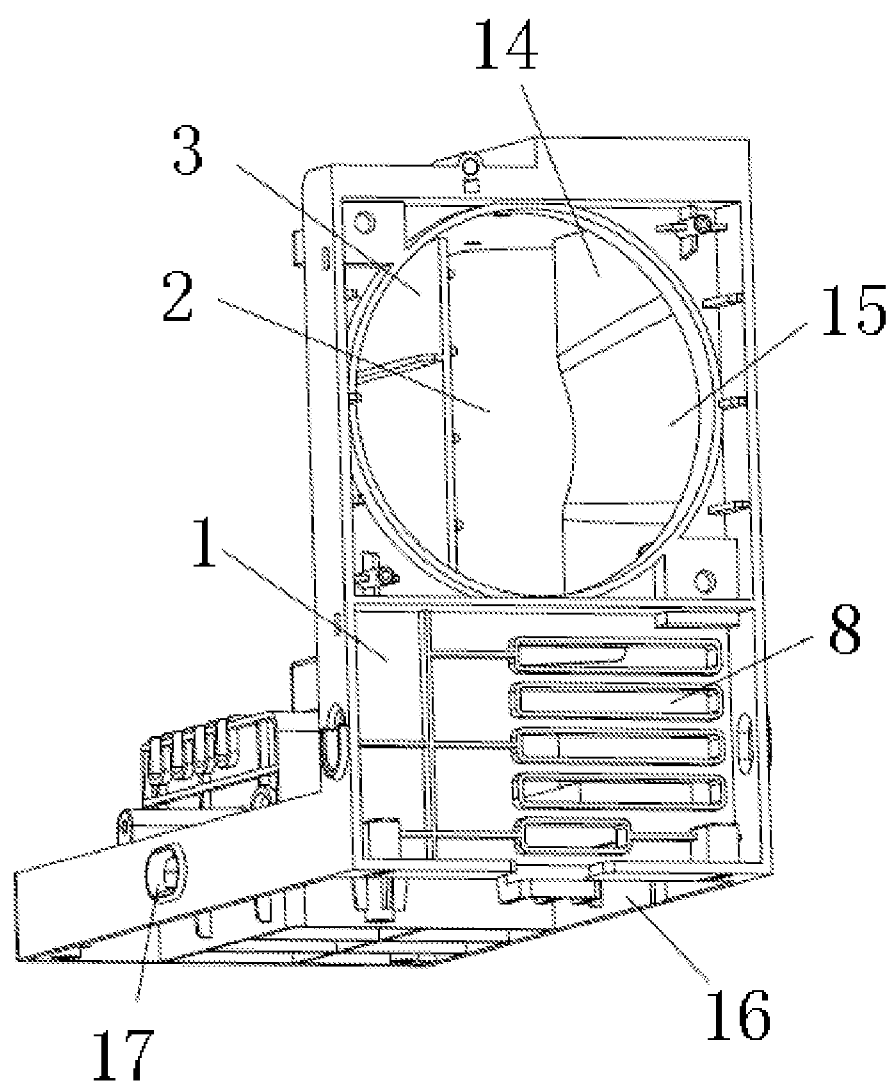
FIG. 3 is a schematic view showing a third structure of a movement support of the present invention to show the structure of a mounting frame.

Referring to FIG. 1 and FIG. 3, the L-shaped base 1 is provided with a mounting frame 16 extending to an end remote from the drainage plate 3, and the horizontal plate of the L-shaped base 1 is provided with a sixth through-hole 17. The mounting frame 16 is provided with a sixth through-hole 17. According to actual heat dissipation requirements, the horizontal plate of the L-shaped base 1 can be provided with a sixth through-hole 17, and the mounting frame 16 is not provided with a sixth through-hole 17. A sixth through-hole 17 can be formed in the mounting frame 16, and the horizontal plate of the L-shaped base 1 is not provided with a sixth through-hole 17. A sixth through-hole 17 can be formed in the horizontal plate of the L-shaped base 1 and the mounting frame 16 at the same time.

When the movement support in the embodiment is being used, an inverter circuit board can be mounted on the base 1 on the side, remote from the drainage plate 3, of the first heat dissipating flow channel. An inverter circuit board can be mounted on the base 1 on the side, remote from the drainage plate 3, of the second heat dissipating flow channel. An inverter circuit board can also be mounted on the circuit board mounting plate 19. Meanwhile, electronic parts and components are mounted in the first inner cavity and the second inner cavity.

When the fan installed in the air inlet 2 is started, the cooling air volume is sent. The cooling air volume is guided by the drainage plate 3, and the cooling air volume cools and dissipates heat to the inverter circuit board installed on two sides of the base 1 through the first heat dissipating flow channel and the second heat dissipating flow channel respectively.

The electronic parts and components mounted in the first inner cavity can connect the inner side with the outer side of the first inner cavity through the first through-hole 8, the second through-hole 9 and the fifth through-hole 18 to form convection, so that the electronic parts and components mounted in the first inner cavity directly dissipate heat for the inverter circuit board outside the first inner cavity.

The electronic parts and components mounted in the second inner cavity can connect the inner side with the outer side of the second inner cavity through the third through-hole 12 and the fourth through-hole 13 to form convection, so that the electronic parts and components mounted in the second inner cavity directly dissipate heat for the inverter circuit board outside the second inner cavity.

Embodiments of the detailed description are all preferred embodiments of the present invention and are not intended to limit the scope of the invention. Therefore, equivalent changes made in accordance with the structure, shape and principle of the present invention are intended to be covered by the scope of the present invention.

What is claimed is:

1. A movement support, comprising a base, wherein an air inlet is formed in the base; a drainage plate is installed on the base on one side of the air inlet; a first heat dissipating flow channel in communication with the air inlet is formed on the base on one side of the drainage plate; a second heat dissipating flow channel in communication with the air inlet is formed on the base on the other side of the drainage plate; the first heat dissipating flow channel and the second heat dissipating flow channel between the drainage plate and the air inlet are in communication with each other; more than two first flow guiding bumps are installed on the drainage plate in the first heat dissipating flow channel; and a distance between two adjacent first flow guiding bumps close to one end of the air inlet is larger than a distance between two adjacent first flow guiding bumps remote from one end of the air inlet.

2. The movement support according to claim 1, wherein a cross-sectional area of the first heat dissipating flow channel is smaller than that of the second heat dissipating flow channel.

3. The movement support according to claim 1, wherein more than one second flow guiding bump is installed on the drainage plate in the second heat dissipating flow channel, and the second flow guiding bumps and the first flow guiding bumps are installed in a staggered manner.

4. The movement support according to claim 1, wherein a first mounting plate is mounted on the base; the first mounting plate is connected to a first supporting plate; a first inner cavity is formed among the first mounting plate, the first supporting plate and the base; the first supporting plate is provided with the drainage plate; and a first through-hole in communication with the first inner cavity is formed in the base.

5. The movement support according to claim 4, wherein at least one of a second through-hole is formed in the base below the air inlet, or a third through-hole is formed in the first mounting plate.

6. The movement support according to claim 4, wherein a flow guiding plate is installed on the first supporting plate on one side, remote from the drainage plate, of the first heat dissipating flow channel, and a flow guiding groove is formed in a side wall of the flow guiding plate on one side close to the first heat dissipating flow channel; and a groove curve of the flow guiding groove at one end connected to the base and an inner wall of the air inlet are arranged on a same surface, and a groove width of the flow guiding groove is sequentially reduced from an end thereof close to the air inlet towards the other end thereof remote from the air inlet.

7. The movement support according to claim 1, wherein a second mounting plate is mounted on the base on one side of a first mounting plate remote from the air inlet; the second mounting plate is connected to a second supporting plate; a second inner cavity is formed among the second mounting plate, the second supporting plate and the base; and the second supporting plate is provided with a fourth through-hole.

8. The movement support according to claim 7, wherein the second mounting plate is provided with a fifth through-hole in communication with the fourth through-hole.

9. The movement support according to claim 1, wherein the base is provided with a mounting frame extending towards one end remote from the drainage plate, and a sixth through-hole is formed in at least one of the base or the mounting frame.

* * * * *